July 24, 1973 C. W. GREENE 3,748,203
METHOD AND APPARATUS FOR POSITIONING A PLURALITY
OF CONTINUOUS STRIPS ON A SUPPORT SURFACE
Filed April 12, 1971 2 Sheets-Sheet 1
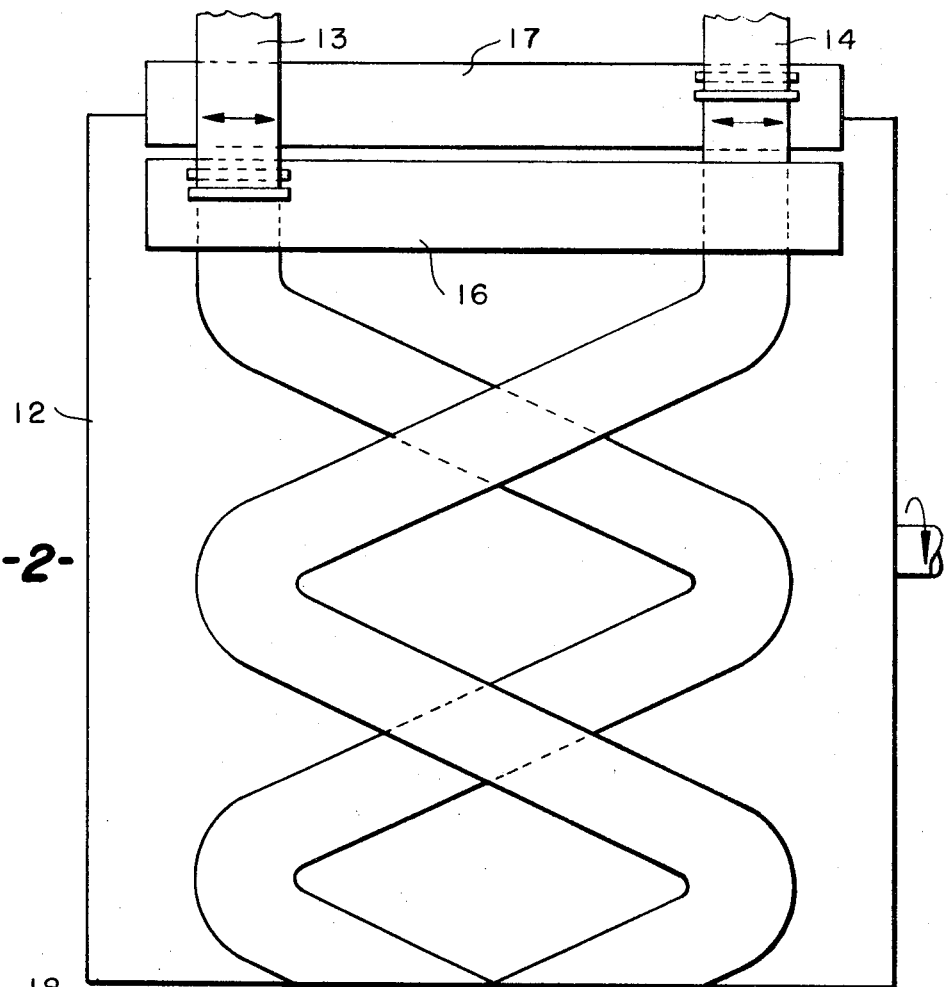
FIG.-2-
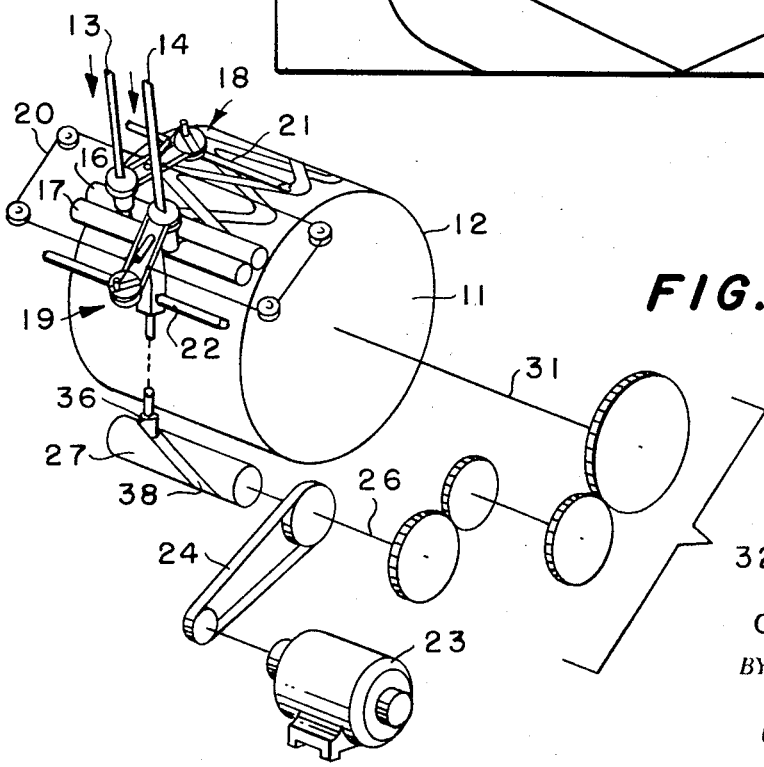
FIG.-1-
INVENTOR.
CHARLES W. GREENE
BY
Arthur L. Urban
ATTORNEY July 24, 1973    C. W. GREENE    3,748,203
METHOD AND APPARATUS FOR POSITIONING A PLURALITY
OF CONTINUOUS STRIPS ON A SUPPORT SURFACE
Filed April 12, 1971    2 Sheets-Sheet 2
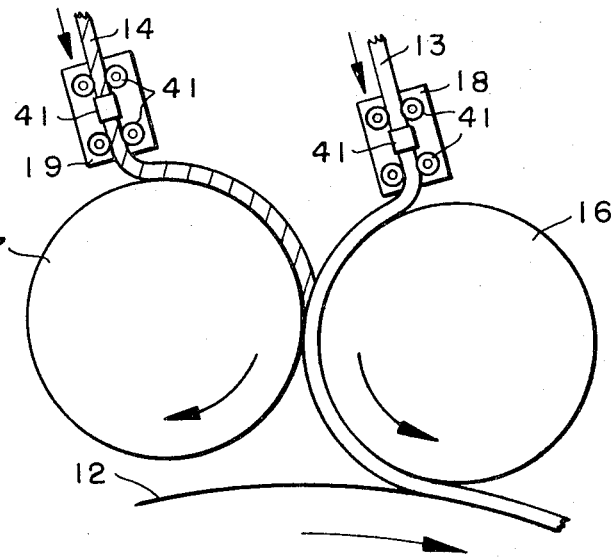
FIG.-3-
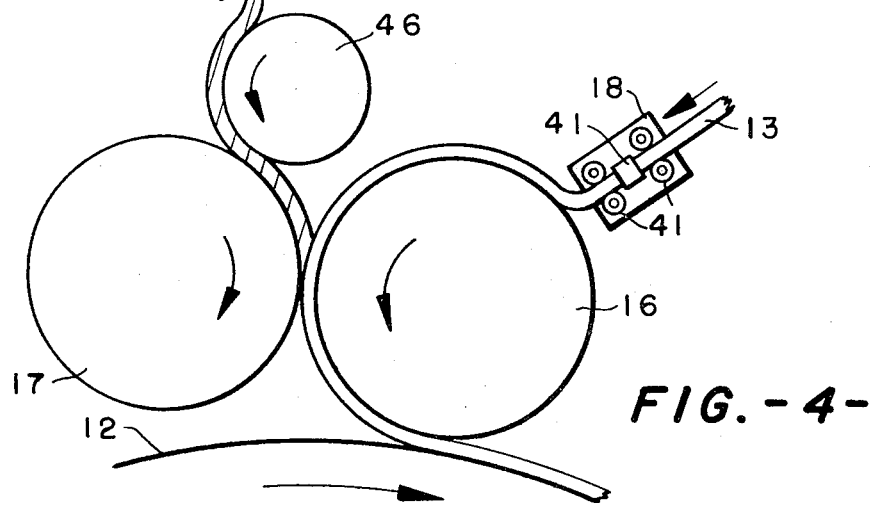
FIG.-4-
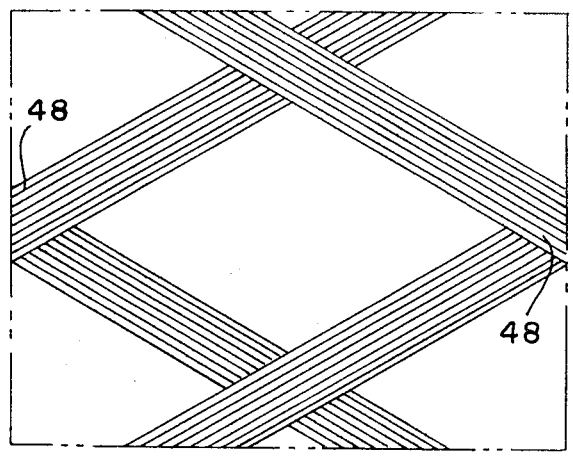
FIG.-5-
INVENTOR.
CHARLES W. GREENE
BY
ATTORNEY

United States Patent Office 3,748,203
Patented July 24, 1973

3,748,203
METHOD AND APPARATUS FOR POSITIONING A PLURALITY OF CONTINUOUS STRIPS ON A SUPPORT SURFACE
Charles W. Greene, Spartanburg, S.C., assignor to Deering Milliken Research Corporation, Spartanburg, S.C.
Filed Apr. 12, 1971, Ser. No. 133,140
Int. Cl. B61h 81/02
U.S. Cl. 156—175          9 Claims

ABSTRACT OF THE DISCLOSURE

A method for positioning a plurality of strips on a support surface in a desired pattern wherein the strips and the support surface have a pressure sensitive adhesive affinity for each other, the method comprising the steps of passing each strip into contact with a rotating intermediate surface, transferring each strip from the intermediate surface to the support surface and pressing each strip against the support surface with rolling pressure adjacent the contact point of the strip with the support surface; each strip including a multiplicity of continuous cords with the relative point of contact between each strip and the support surface being such that each strip is positioned on the support surface in a preselected pattern with respect to the other strips positioned on the support surface. Also, apparatus for conducting the above method.

---

The tire industry has shown considerable interest in tire constructions which include an annular reinforcement or belt about the periphery of the tire between the carcass and tread portions thereof. Such belted tires have better road stability and longer tread life both in radial ply and bias ply carcass constructions.

The annular reinforcements are conventionally formed of cord or wire coated with or embedded in a suitable insulating material such as rubber or some other plastic material which is compatible with and has an adhesive affinity to the rubber of the tire. The cord usually is disposed in a pattern in which portions thereof extend at an angle to the longitudinal axis of the reinforcement. One such construction utilizes bias cut woven fabric which has been calendered with a layer of unvulcanized rubber. Also, it has been proposed to form reinforcements by winding one or more cords or strips onto a rotating drum while employing a reciprocating guide to traverse the drum surface and lay the cord or cords in a generally zigzag pattern thereon. Examples of such belts are disclosed in U.S. Pat. Nos. 2,982,327 and 3,442,874.

One of the considerations in the design of the reinforcement is the minimizing of lateral forces in tires due to the pattern of the outermost layer of the belt. This effect is evident when tires are mounted on a vehicle or on a test wheel under load. These lateral forces create vibrations in the vehicle on which the tires are mounted and in the tire itself, thus reducing the life of the tire and creating vehicle handling problems.

One way of minimizing such lateral forces is to form the reinforcement from a plurality of strips. However, problems arise in the winding of more than one strip simultaneously due to the traversing of the extra guides. The design of the machine must provide for free movement of each guide without interference from the others.

The present invention provides a novel method and apparatus for producing an endless reinforcement for tires from a plurality of strips which does not create significant lateral forces in tires. Furthermore, the invention provides a new method and apparatus for simply and conveniently positioning a plurality of strips on a support surface in a desired pattern with a high degree of accuracy.

Other advantages and benefits of the invention will become apparent from the following detailed discussion and the description of the drawings in which:

FIG. 1 is a schematic illustration of one form of apparatus of the invention for producing an endless reinforcement;

FIG. 2 is an enlarged view of the drum portion of the apparatus shown in FIG. 1;

FIG. 3 is an enlarged fragmentary side elevation of the guide and transfer roll portions of the apparatus shown in FIG. 1;

FIG. 4 is an enlarged fragmentary side elevation of another guide and transfer roll arrangement in the apparatus of the invention; and FIG. 5 is a plan view of a portion of the pattern of a partially formed reinforcement made with the guide and transfer roll arrangement shown in FIG. 4.

As shown in the drawings, apparatus of the invention for forming an endless reinforcement includes a rotatable winding drum 11 having a generally cylindrical outer surface 12 providing a supporting surface for cord strips 13 and 14 to be positioned thereon. Associated with drum 11 are rolls 16 and 17 and strip guides 18 and 19 mounted for movement on rods 21 and 22. Guides 18 and 19 are interconnected by cable and pulley arrangement 20. Drum 11 and guides 18 and 19 are driven by a power source shown as motor 23. Motor 23 is drivingly connected through a belt and pulley arrangement 24 to a rotatable shaft 26. Shaft 26 is connected to barrel cam 27 and also to drive shaft 31 for drum 11 through a suitable gear train 32. Cam follower 36 connected to guides 18 and 19 engages groove 38 in the surface of cam 27. Groove 38 is of such a configuration that during the rotation of the winding drum 11, guides 18 and 19 reciprocate across drum surface 12 transversely to the direction of rotation of drum 11.

Gear train 32 includes a suitable arrangement of gears to control the movement of guides 18 and 19 with respect to drum 11 so that the strips are laid on the drum surface 12 in a predetermined pattern. This control of guide movement during drum rotation provides for the achievement of a complete reinforcement, that is, a belt in which the strip spacing and configuration is in accordance with a preselected pattern.

Referring to FIG. 3 of the drawings, the guides 18 and 19 include a plurality of spaced rollers 41 between which the strips 13 and 14 move as they are transferred to intermediate rolls 16 and 17 respectively. Roll 16 bears against drum surface 12 and against roll 17. With certain patterns it may be desirable to space rolls 16 and 17 about the periphery of drum 11 with each roll bearing against the drum surface.

Additional rolls may be employed to change the particular face of the strip in contact with the drum surface 12 as shown in FIG. 4. Such a guide and transfer roll arrangement is particularly useful in forming reinforcements with folds at the edges. In addition to rolls 16 and 17, a third roll 46 which bears against roll 17 is included.

In conducting the method of the present invention with the apparatus shown in FIGS. 1-3, strips 13 and 14 pass through guides 18 and 19 respectively and between rollers 41 thereof into contact with transfer rolls 16 and 17. Strip 13 passes around a portion of the periphery of roll 16 to the nip thereof with drum surface 12. Simultaneously, strip 14 passes around a portion of the periphery of roll 17 to the nip thereof with roll 16 where it is transferred to the periphery of roll 16 and around the periphery thereof together with strip 13 to the nip of roll 16 with drum surface 12. At this point strips 13 and 14 are pressed with rolling pressure against drum surface 12 and adhere thereto.

Guides 18 and 19 reciprocate along rods 21 and 22 respectively to change the points on rolls 16 and 17 that strips 13 and 14 are deposited. This change in the deposition points causes the strips to be positioned on drum surface 12 in a preselected pattern. Continuation of the deposition of the strips on the drum surface completes the pattern of the reinforcement. To produce a reinforcement in which the strips are folded at the edges with identical mirror image folds 48 as shown in FIG. 5, the guide and roll arrangement shown in FIG. 4 may be employed. The folds at the edges are formed by turning guides 18 and 19 at each end of their traverse. With this roll arrangement, each strip is folded to place the same surface in contact with roll 16 as it is transferred by that roll into contact with the drum surface 12 and in this way produces a mirror image pattern with the strips balanced throughout the circumference of the reinforcement. While the use of the third roll 46 is particularly advantageous in the formation of folded two-strip belts, it will be apparent that this same arrangement also can be employed for reinforcements of other designs where it is desirable to have the same face of each strip in contact with the drum surface.

Additional rolls may be employed in combination with transfer rolls 16 and 17 to assist in the guiding and positioning of the strips on the transfer rolls. It also may be desirable to provide split rolls, that is, rolls which are divided into two or more segments disposed axially of one another across the drum surface. With such an arrangement one segment of the roll may be rotated at a different speed from that of the adjacent segment. This may be useful in situations where the tension in one strip is different from that of another strip. Faster rotation of the roll associated with the strip under lower tension causes the strip to be transferred at a faster rate and thus increases and equalizes the tension of that strip with respect to the other. Provision also can be made for manual rotation of the respective roll segments to permit slight relative movement thereof during certain portions of the production cycle, e.g., at the beginning or the end.

The apparatus of the invention also provides a convenient method for winding multicord strips in which the turns at the edges are flat and without folds. This is particularly true with strips in which the cords are metal wires that tend to resist deformation and bending. With such strips the guides 18 and 19 deposit the strips on the transfer rolls 16 and 17 and adhere the strips securely thereto to prevent shifting or dislocation of the strips. The association of the transfer rolls with the drum surface thus provides for the accurate placement of the strips from the point of initial contact with the transfer rolls to the end of their contact with roll 16 at its nip with the drum surface. This arrangement provides for smooth and sharp turning of the strips without buckling or kinking thereof.

The above description and drawings show that the present invention provides a novel method and apparatus for producing an endless reinforcement for tires from a plurality of strips which does not create significant lateral forces in tires in which it is included. Furthermore, the invention provides a new method and apparatus for simply and conveniently positioning a plurality of strips on a support surface in a desired pattern with a high degree of accuracy. In addition, the method and apparatus facilitate the disposition of the strips in a zigzag pattern with smooth flat turns at the edges of the pattern. Moreover, the method and apparatus are particularly useful in the production of strip belts having folded edges.

Another advantage of the utilization of transfer rolls in the apparatus of the invention is the flexibility of pattern formation. For example, the pattern may be changed by increasing or decreasing the amount of travel on the transfer rolls of one strip with respect to the other. This may be accomplished by changing the angular displacement of one guide about its respective transfer roll.

It will be apparent that various modifications in the procedures, materials and apparatus described in detail and shown in the drawings can be made within the scope of the invention. For example, the number, size and arrangement of transfer rolls can be modified. Therefore, the foregoing description and drawings are intended to illustrate preferred embodiments of the invention and the scope of the invention is to be limited only by the following claims.

That which is claimed is:

1. A method for producing an endless tire reinforcement by positioning a plurality of continuous strips on a substantially cylindrical support surface in a desired zigzag pattern with a plurality of repeating cycles per revolution of said support surface wherein the strips and the support surface have a pressure sensitive adhesive affinity for each other, said method comprising the steps of passing each strip into contact with a rotating intermediate surface which is in contact with said support surface and which extends across an entire width of said pattern, transferring each strip from said intermediate surface to said support surface and pressing each strip against said support surface with rolling pressure adjacent the contact point of the strip with said support surface, said rolling pressure being applied simultaneously across an entire width of said pattern; and rotating said support surface as said strips are being pressed thereon to produce an endless reinforcement with a plurality of wraps; each strip including a multiplicity of continuous cords with the relative point of contact between each strip and the support surface being such that each strip is positioned on said support surface in a preselected zigzag pattern with respect to the other strips positioned on said support surface.

2. A method according to claim 1 wherein relative movement between the support surface and the strips prior to contact is effected by longitudinally moving the support surface past the intermediate surface.

3. A method according to claim 1 wherein each strip is moved transversely to the direction of movement of the support surface.

4. A method according to claim 2 wherein transverse movement of each strip is effected by reciprocating the strip with respect to the intermediate surface during rotation thereof to produce a zigzag cord pattern on said support surface.

5. A method according to claim 4 wherein each strip is folded at the ends of the transverse movement.

6. A method according to claim 4 wherein each strip is turned in a generally flat turn at the ends of the transverse movement.

7. Apparatus for positioning a plurality of continuous strips on a support surface in a desired zigzag pattern with a plurality of repeating cycles per revolution of said support surface including a generally cylindrical support surface, a roll in contact with said support surface and disposed transversely to said support surface, at least one other roll in contact with said first roll with the axes of said rolls substantially parallel to each other and the rolls extending across an entire width of said pattern, and guide means associated with each roll to guide a strip into contact with each roll, said guide means being movable transversely of said support surface in a reciprocating pattern.

8. Apparatus according to claim 7 including a third roll positioned adjacent said second roll with its axis substantially parallel to said second roll.

9. Apparatus according to claim 7 wherein said guide means are pivotable at the ends of said transverse movement.

(References on following page)

References Cited

UNITED STATES PATENTS

| | | | |
|---|---|---|---|
| 3,365,352 | 1/1968 | Van Burleigh et al. | 161—58 |
| 3,418,191 | 12/1968 | Dieckmann et al. | 156—405 |
| 1,669,620 | 5/1928 | Maas | 156—405 |
| 3,113,738 | 12/1963 | Vanzo | 156—117 X |
| 2,002,970 | 5/1935 | Willshaw et al. | 156—405 |
| Re. 25,349 | 3/1963 | Hanson | 156—117 X |
| 3,002,874 | 10/1961 | Lowe | 156—397 |
| 3,616,001 | 10/1971 | Addis | 156—117 |

FOREIGN PATENTS

| | | | |
|---|---|---|---|
| 1,447 | 1/1913 | Great Britain | 156—397 |
| 848,962 | 9/1960 | Great Britain | 156—117 |

ALFRED L. LEAVITT, Primary Examiner

C. B. COSBY, Assistant Examiner

U.S. Cl. X.R.

156—110 X, 117, 128, 133, 397, 446; 161—58; 242—43, 178